(12) United States Patent
Goering (10) Patent No.: US 11,576,292 B2
(45) Date of Patent: Feb. 14, 2023

(54) ROW CLEANER ASSEMBLY

(71) Applicant: DEERE & COMPANY, Moline, IL (US)

(72) Inventor: Kevin J. Goering, Cambridge, IA (US)

(73) Assignee: DEERE & COMPANY, Moline, IL (US)

( * ) Notice: Subject to any disclaimer, the term of this patent is extended or adjusted under 35 U.S.C. 154(b) by 415 days.

(21) Appl. No.: 16/669,792

(22) Filed: Oct. 31, 2019

(65) Prior Publication Data

US 2021/0127541 A1    May 6, 2021

(51) Int. Cl.
  *A01B 35/16*  (2006.01)
  *A01B 49/02*  (2006.01)
  *A01C 5/06*   (2006.01)

(52) U.S. Cl.
  CPC ............ *A01B 35/16* (2013.01); *A01B 49/027* (2013.01); *A01C 5/064* (2013.01)

(58) Field of Classification Search
  CPC ........ A01B 35/16; A01B 49/027; A01C 5/064
  USPC ......................................................... 111/139
  See application file for complete search history.

(56) References Cited

U.S. PATENT DOCUMENTS

| | | | |
|---|---|---|---|
| 4,760,806 A | 8/1988 | Bigbee et al. | |
| 4,785,890 A | 11/1988 | Martin | |
| 5,341,754 A | 8/1994 | Winterton | |
| 5,507,351 A * | 4/1996 | Martin | A01C 7/006 172/558 |
| 5,878,678 A | 3/1999 | Stephens et al. | |
| 5,970,892 A | 10/1999 | Wendling et al. | |
| 6,135,037 A * | 10/2000 | Juptner | A01C 5/06 111/139 |
| 6,223,663 B1 | 5/2001 | Wendling et al. | |
| 6,253,692 B1 | 7/2001 | Wendling et al. | |

(Continued)

FOREIGN PATENT DOCUMENTS

CA    2508844 A1    11/2006

OTHER PUBLICATIONS

Extended European Search Report and Written Opinion issued in European Patent Application No. 20202200.0, dated Mar. 25, 2021, in 9 pages.

(Continued)

*Primary Examiner* — Tara Mayo-Pinnock
(74) *Attorney, Agent, or Firm* — Taft Stettinius & Hollister LLP; Stephen F. Rost (57) ABSTRACT

A seeder assembly for placing a commodity in underlying soil that has a frame member having at least one ground engaging mechanism configured to contact an underlying surface, a rockshaft pivotally coupled to the frame member and pivotal between a lowered position and a raised position, a plurality of disk opener assemblies coupled to the rockshaft, the disk opener assemblies each having a single disk opener configured to cut into the underlying soil to provide an opening for the commodity, a plurality of row cleaner assemblies pivotally coupled to the frame member and each having a row cleaner configured to move residue on the underlying surface, and a plurality of linkages each coupling the rockshaft to a corresponding one of the plurality of row cleaner assemblies. When the rockshaft is in the raised position, the plurality of linkages maintain the corresponding plurality of row cleaner assemblies in a raised position.

19 Claims, 10 Drawing Sheets

(56) References Cited

U.S. PATENT DOCUMENTS

| | | | |
|---|---|---|---|
| 6,345,671 B1 | 2/2002 | Siemens et al. | |
| 7,673,570 B1 | 3/2010 | Bassett | |
| 7,946,231 B2 | 5/2011 | Martin et al. | |
| 8,763,713 B2 | 7/2014 | Bassett | |
| 9,232,687 B2 | 1/2016 | Bassett | |
| 2010/0000451 A1 | 1/2010 | Martin et al. | |
| 2011/0185955 A1 | 8/2011 | Martin | |
| 2013/0312988 A1 | 11/2013 | Bassett | |
| 2014/0048001 A1 | 2/2014 | Bassett | |
| 2014/0262370 A1* | 9/2014 | Kohn et al. | A01B 49/027 172/140 |
| 2015/0144039 A1* | 5/2015 | Benko et al. | A01C 5/064 111/119 |
| 2019/0297769 A1* | 10/2019 | Zielke et al. | A01B 63/008 |

OTHER PUBLICATIONS

DAWN Equipment Company, Inc. 2017; DAWN Products: http://www.dawnequipment.com/Dawn_Products.html.

\* cited by examiner

ROW CLEANER ASSEMBLY

FIELD OF THE DISCLOSURE

The present disclosure relates generally to row cleaner for an agricultural machine, and more specifically to a row cleaner for a seeder having single disk drill opener.

BACKGROUND

Air seeders, grain drills, and the like are frequently used for no till or reduced till applications. Often, these machines utilize a single cutting disk per row being planted to cut through the residue and soil to provide a location in the soil for the seed or other commodity to be distributed. In no or reduced till machines, the single cutting disk must cut through any overlying residue to ensure the seed or other commodity is positioned in the soil. If the residue on the underlying surface is too tough or the soil is too soft, the cutting disk may fail to cut through the residue and wedge the residue into the opening intended for the seed or other commodity. When residue is wedged in the opening, the seed or other commodity is "hairpinned" on top of the residue in the opening. The hairpinned seed or commodity then fails to perform as expected because it was not properly distributed into the soil. Further still, if the residue over a planted seed is too thick, it may prevent the soil around the seed from being sufficiently heated by the sun to allow the seed to germinate and emerge therefrom.

SUMMARY

One embodiment is a seeder assembly for placing a commodity in underlying soil. The air seeder has a frame member having at least one ground engaging mechanism configured to contact an underlying surface, a rockshaft pivotally coupled to the frame member and pivotal between a lowered position and a raised position, a plurality of disk opener assemblies coupled to the rockshaft, the disk opener assemblies each having a single disk opener configured to cut into the underlying soil to provide an opening for the commodity, a plurality of row cleaner assemblies pivotally coupled to the frame member and each having a row cleaner configured to move residue on the underlying surface, and a plurality of linkages each coupling the rockshaft to a corresponding one of the plurality of row cleaner assemblies. Wherein, when the rockshaft is in the raised position, the plurality of linkages maintain the corresponding plurality of row cleaner assemblies in a raised position wherein each row cleaner of the plurality of row cleaner assemblies is spaced from the underlying surface.

In one example of this embodiment, each of the plurality of linkages is a hydraulic, pneumatic, or spring that provides a downforce to the corresponding row cleaner towards the underlying surface when the rockshaft is in the lowered position. In another example, each of the plurality of row cleaner assemblies is pivotally coupled to the frame member at a location forward of the corresponding row cleaner in a direction of travel of the seeder assembly. In yet another example, the plurality of linkage assemblies each apply a downforce to the corresponding row cleaner towards the underlying surface when the rockshaft is in the lowered position, said downforce being selectably changeable.

In another example of this embodiment, each of the plurality of disk opener assemblies have a gauge wheel and a closing wheel and each of the plurality of disk openers are coupled to the rockshaft wherein when the rockshaft is in the raised position, the disk opener of each of the plurality of disk opener assemblies is spaced from the underlying surface. In yet another example, the plurality of disk opener assemblies are spaced to place commodity in rows that are no greater than fifteen inches from an adjacent row of the seeder assembly. In another example, each of the plurality of disk opener assemblies are fed a commodity through an air hose. One example includes a residue guard coupled to at least one of the plurality of row cleaner assemblies and spaced therefrom to prevent debris offset by one of the row cleaners from covering an adjacent row.

Another embodiment is a seeder assembly that has a frame, a disk opener assembly pivotally coupled to the frame, and a row cleaner assembly having an arm that is pivotally coupled to the frame on a first end and having a row cleaner rotationally coupled thereto on a second end. Wherein, the first end of the arm is positioned forward of the second end in a direction of travel to allow the row cleaner to pivot at least partially away from obstructions as the seeder assembly moves in the direction of travel.

In one example of this embodiment, the row cleaner is angled relative to the direction of travel to divert residue away from the disk opener assembly. In one aspect of this example, the row cleaner assembly has a residue guard coupled to the arm to block residue diverted by an adjacent row cleaner from being positioned over a row created by the disk opener assembly.

Another example of this embodiment has a rockshaft pivotally coupled to the frame and having a raised position and a lowered position and a linkage coupled to the rockshaft on one end and the arm on the other end. Wherein, as the rockshaft pivots from the lowered position to the raised position, the linkage pivots the arm about the first end relative to the frame. In one aspect of this example, the disk opener assembly is pivotally coupled to the frame through the rockshaft. In another aspect of this example, the linkage is a pneumatic cylinder that is part of an electro-pneumatic system wherein the pressure provided to the pneumatic cylinder is selectable through a user interface to alter a down force applied to the arm. In yet another aspect of this example, when the rockshaft is in the raised position, the row cleaner is spaced from an underlying surface.

In another example of this embodiment, the disk opener assembly has no more than one disk opener that is configured to create a slot in underlying soil for a commodity to be placed in. In another aspect of this example, the disk opener assembly is coupled to an air seeder assembly that distributes a commodity into the slot created by the one disk opener.

Yet another embodiment is a method for assembling a seeder. The method includes providing a frame member, a rockshaft, a plurality of disk opener assemblies each having a single disk opener, a plurality of row cleaner assemblies each having a row cleaner, and a plurality of linkages, pivotally coupling the rockshaft to the frame member to allow the rockshaft to pivot between a lowered position and a raised position, pivotally coupling the plurality of disk opener assemblies to the rockshaft, pivotally coupling one end of each of the plurality of row cleaner assemblies to the frame member, and coupling each of the plurality of linkages to the rockshaft on one end and to one of the plurality of row cleaner assemblies on the other end. Wherein, when the rockshaft is in the raised position, the plurality of linkages maintain the corresponding plurality of row cleaner assemblies in a raised position wherein each row cleaner of the plurality of row cleaner assemblies is spaced from the underlying surface.

In one example of this embodiment, each of the plurality of linkages are pneumatic cylinders and the pneumatic cylinders are fluidly coupled to an electro-pneumatic system. Another example of this embodiment includes coupling a residue guard to at least one of the plurality of row cleaner assemblies.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
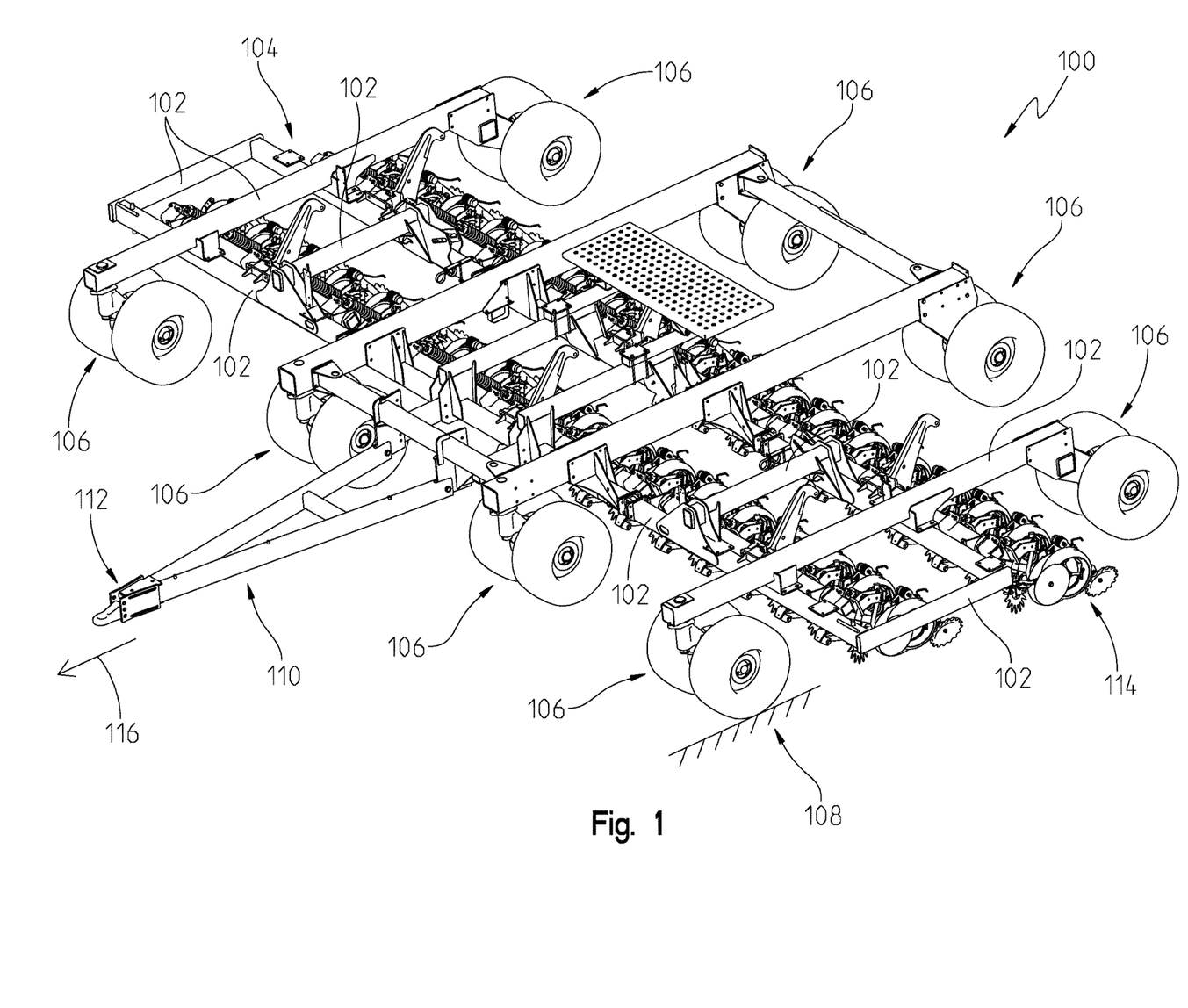
FIG. 1 is an elevated perspective view of a seeder.

Referring to FIG. 1 a seeder assembly 100 is illustrated. The seeder assembly 100 may have one or more interconnected frame members 102 coupled to one another to provide a frame assembly 104. The frame assembly 104 may have one or more ground engaging mechanism 106 rotationally coupled thereto to allow the frame assembly 104 to travel along an underlying surface 108. Further, the frame assembly may have a tongue 110 that has a coupler 112 that is configured to couple the frame assembly 104 to a work machine such as a tractor.

The ground engaging mechanisms 106 may maintain a desired spacing between the frame assembly 104 and the underlying surface 108. In one non-exclusive example, the desired spacing of the frame assembly 104 may be fixed by the rotational coupling location of the ground engaging mechanisms 106. In another example, the rotation axis of the ground engaging mechanisms 106 may be selectively altered by a user through a hydraulic or pneumatic cylinder coupled to a corresponding hydraulic or pneumatic system. In this configuration, the desired spacing of the frame assembly 104 relative to the underlying surface 108 may be selectively altered by selectively altering the length of the hydraulic or pneumatic cylinder.

Regardless of the spacing of the frame assembly 104 from the underlying surface 108, the frame assembly 104 may have a plurality of disk opener assemblies 114 coupled thereto. The disk opener assemblies 114 may be spaced along the frame assembly 104 and coupled to a planting system to distribute seed or any other type of commodity into the soil of the underlying surface 108 as the seeder 100 is pulled in a direction of travel 116 by the tractor or the like. More specifically, each opener assembly 114 may have a single disk opener 302, a gauge wheel 304, and a closing wheel 306 among other things coupled thereto (see FIG. 3a). The opener assemblies 114 may selectively cut an opening into the underlying surface 108 with the single disk opener 302 and distribute seed or other commodity therein through an air hose 308 or other conduit that directs the commodity into the opening. The gauge wheel 304 may ensure the disk opener 302 creates an opening having the desired depth for the commodity while the closing wheel 306 may cover the opening after the commodity has been placed therein.

The disk opener assemblies 114 may be configured to work with any type of commodity distribution system. In one non-exclusive example, the opener assemblies 114 are part of an air seeder system that distributes commodity into the openings created by the disk opener assemblies 114 through an air flow system and conduit. In another example, the opener assemblies 114 are configured to work with grain drill configurations that distribute commodity to the opening through conduit.

Figure 2:
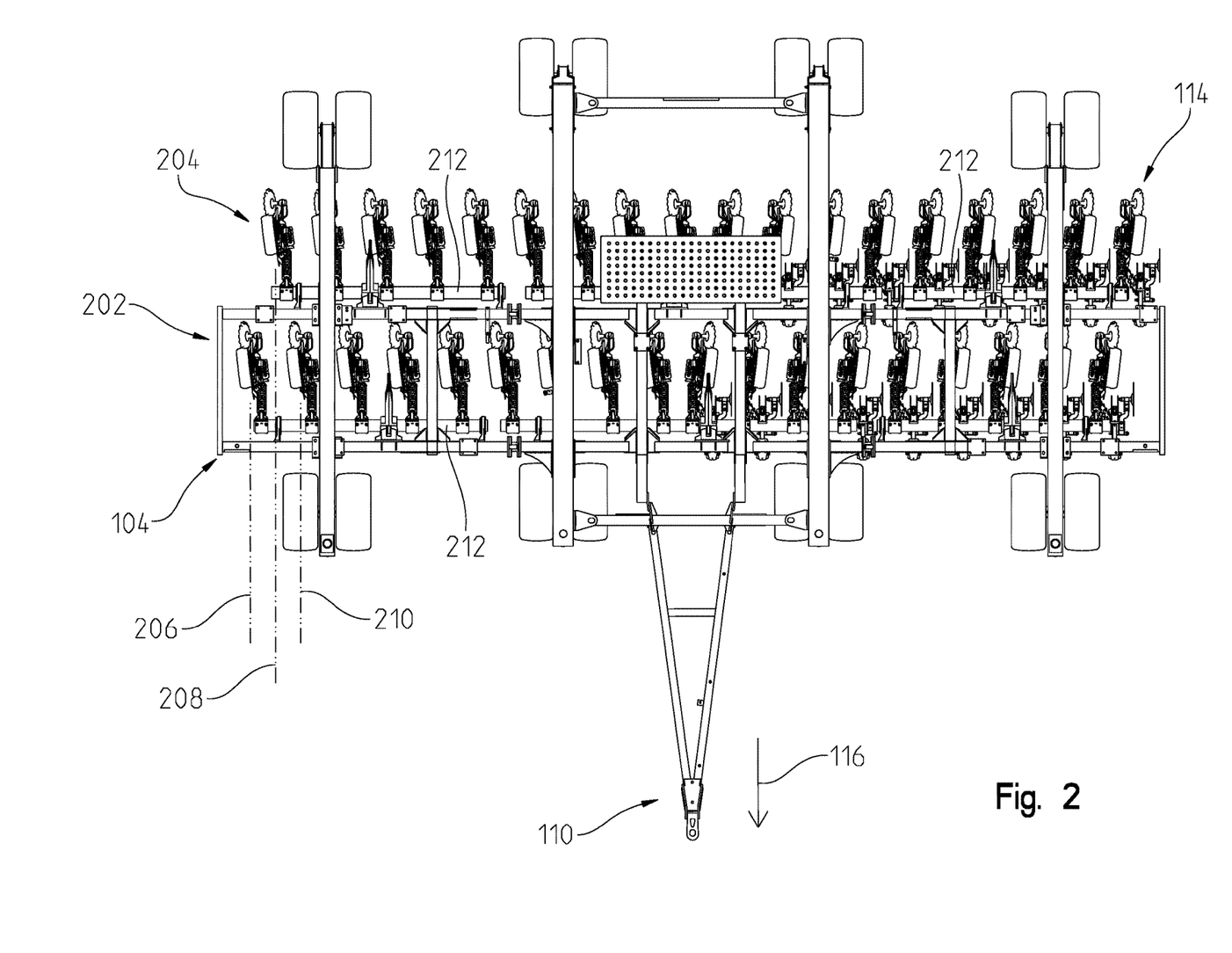
FIG. 2 is a top view of the seeder of FIG. 1.

Referring now to FIG. 2, there may be two separate banks of opener assemblies 114 spaced along the frame assembly 104. The two banks may have a front bank 202 and a rear bank 204 wherein adjacent rows are created by opener assemblies 114 from alternating banks 202, 204. That is to say, a first row 206 may be formed by an opener assembly 114 from the front bank 202 while an adjacent second row 208 may be formed by an opener assembly 114 from the rear bank 204. A next adjacent third row 210 may be formed by an opener assembly 114 from the front bank 202 and the seeder 100 may alternate banks 202, 204 across the width of the seeder 100 in a similar fashion.

In one aspect of this disclosure, alternating the banks 202, 204 of the opener assemblies 114 may allow for sufficient spacing between opener assemblies 114 to allow for substantially close row spacing (i.e. about 15 inches or less between rows). However, the teachings of this disclosure may be implemented on planters and seeders with any row spacing. Each opener assembly 114 may have twice the side clearance available in the banked configuration of FIG. 2 compared to planting the same spaced rows in a single bank of opener assemblies 114. Accordingly, the banked opener assembly 114 configuration may be well suited for planting seeds or other commodity along rows that are about fifteen inches or less from one another.

Figure 3A:
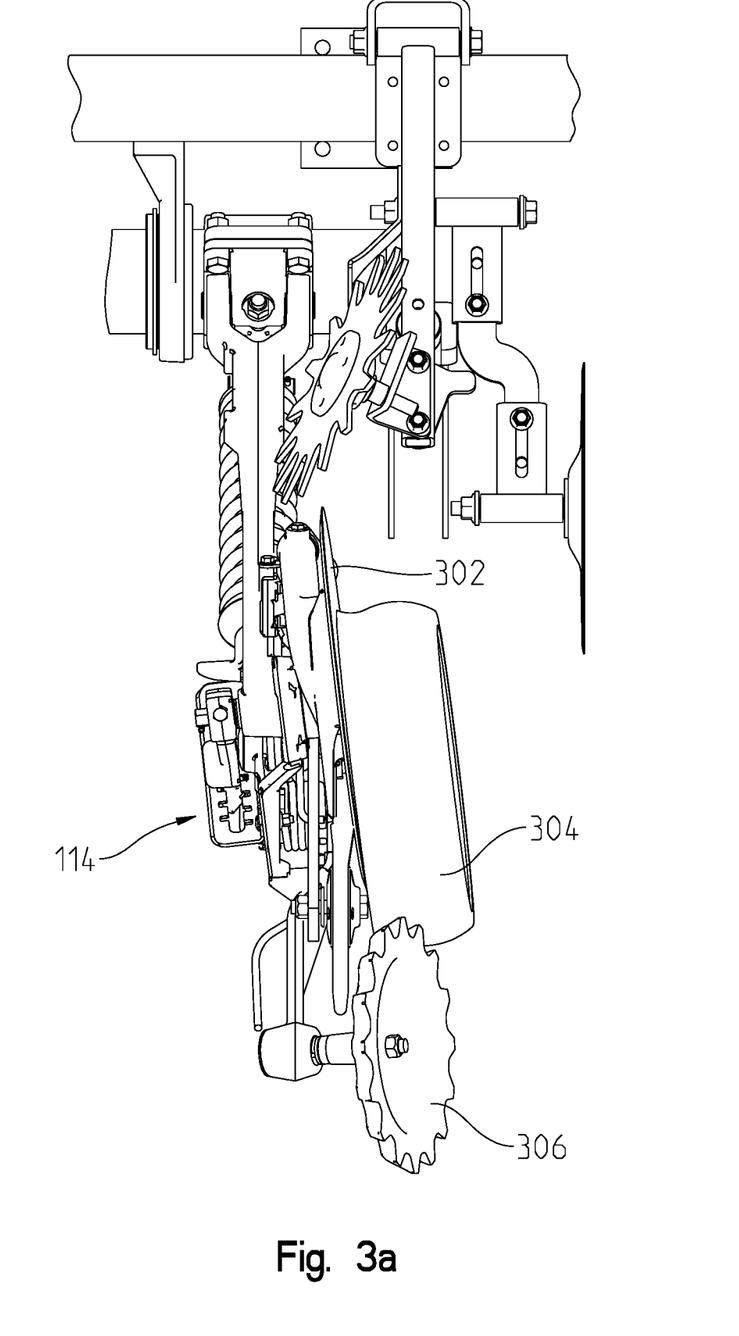
FIG. 3a is a bottom view of an opener assembly from the seeder of FIG. 1.
Figure 3B:
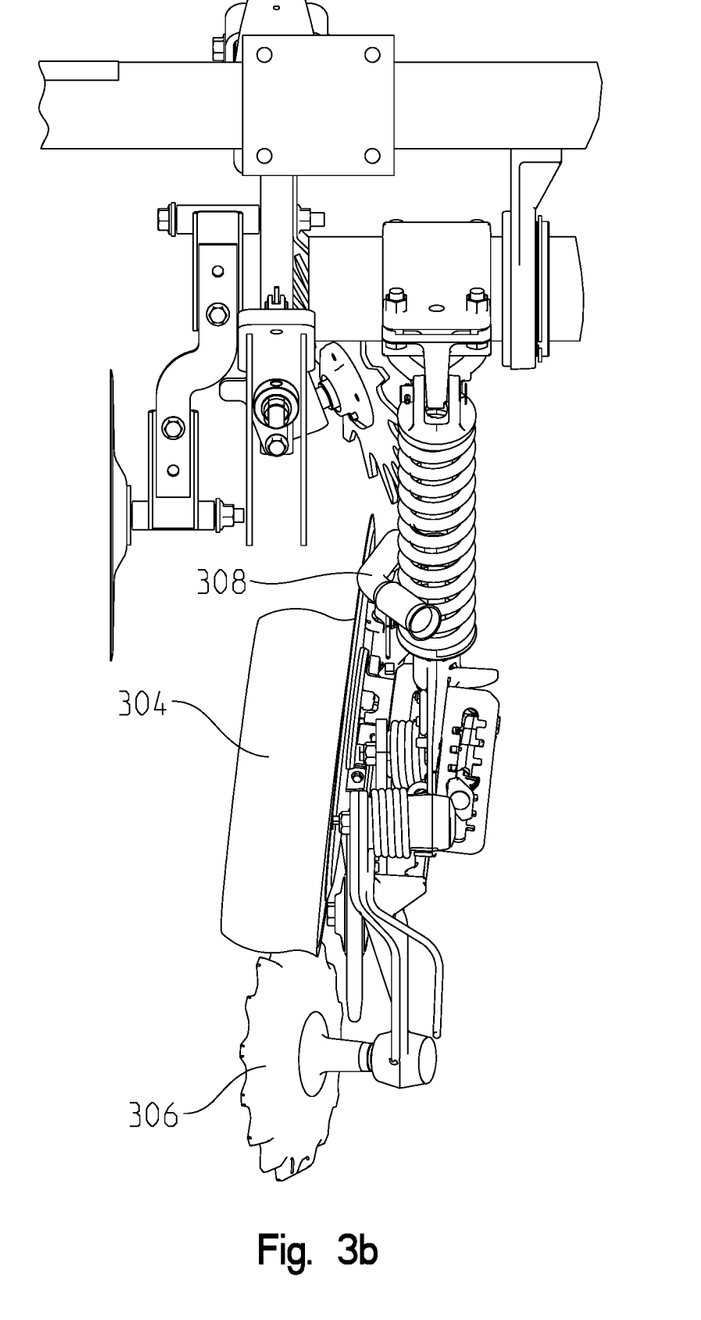
FIG. 3b is a top view of an opener assembly of the seeder of FIG. 1.

In another aspect of this disclosure, the opener assemblies 114 may utilize the single disk opener 302 for no till, or reduced till applications. That is to say, the seeder 100 may be designed to work fields that have not been tilled or had minimal tilling. In these types of fields, the single disk opener 302 may be configured to substantially cut through any residue remaining on the underlying surface 108 while making the opening for the commodity. Further, the single disk opener 302 and reduced till configuration may allow for greater vehicle speed during a planting operation compared other openers known in the art. However, the teachings of this disclosure may also be applied to planters or seeders having multiple disk openers or that utilize any other known method for forming the opening for a commodity.

In one aspect of this disclosure, the opener assemblies 114 may be coupled to a rockshaft 212 of the seeder 100. The seeder may have a plurality of rockshafts 212 spaced along the frame assembly 104. Each rockshaft 212 may have a square cross-section and be rotationally coupled to the adjacent frame assembly 114 via bearings or the like. Each rockshaft 212 generally extends in a direction transverse of the direction of travel 116. Further, each rockshaft 212 may have a plurality of opener assemblies 114 coupled thereto. In one non-exclusive example, a rockshaft 212 may have five opener assemblies 114 coupled thereto. In another example, a rockshaft 212 may have eight opener assemblies 114 coupled thereto. However, this disclosure considers coupling any number of opener assemblies 114 to any one rockshaft 212.

Figure 4:
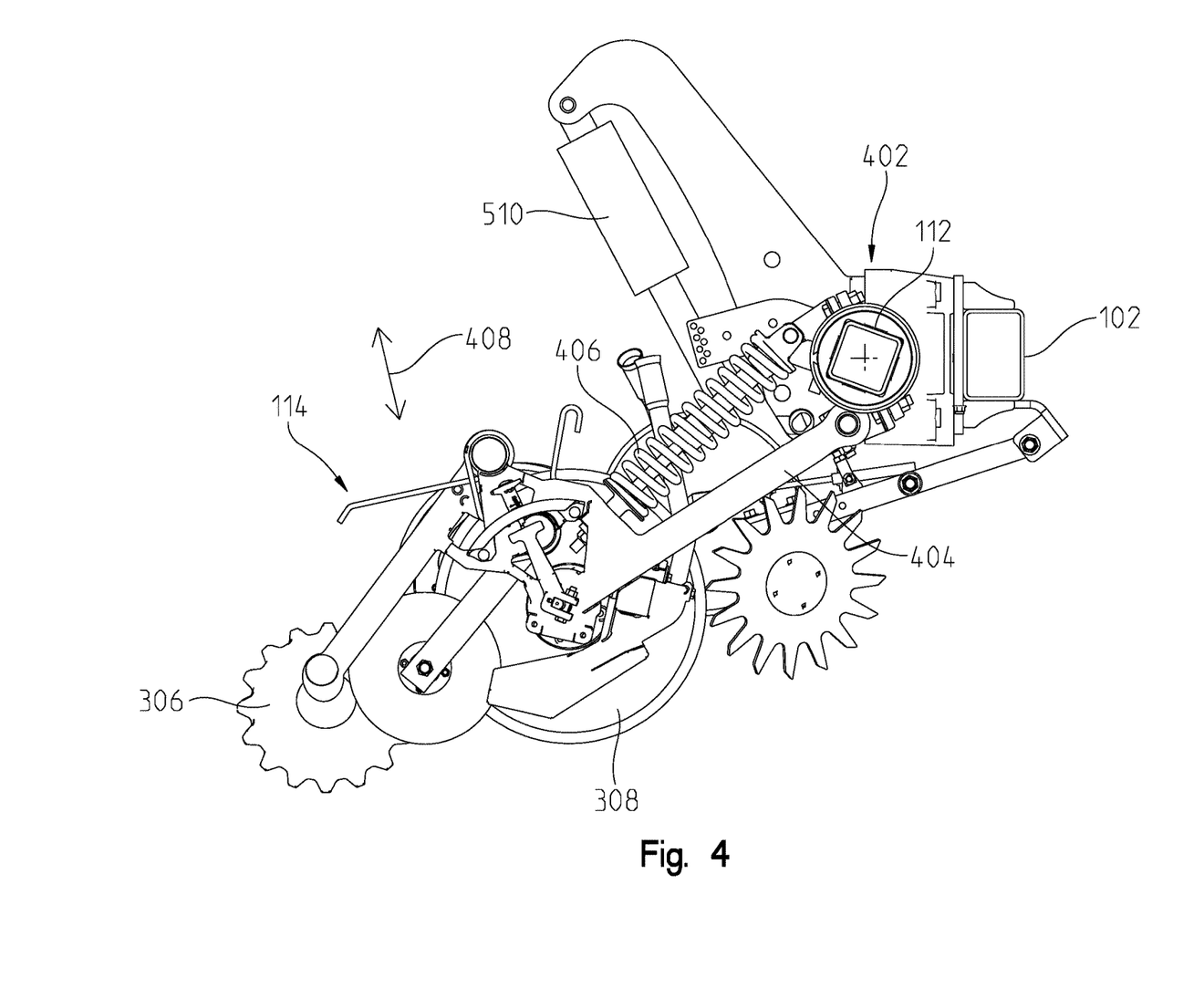
FIG. 4 is a sectional side view of an opener assembly of the seeder of FIG. 1.

FIG. 4 shows a partial side section view of the seeder 100. More specifically, in FIG. 4 the rockshaft 212 is illustrated pivotally coupled to a frame member 102 through a bearing assembly 402. The bearing assembly 402 may be coupled to the frame member 102 utilizing any known coupling method such as fasteners, welds, or the like. Further, the bearing assembly 402 may define a through-hole there through sized to receive the outer race of a bearing. The bearing assembly 402 may receive a bearing in the through-hole that has an inner race sized to receive the rockshaft 112. In this configuration, the rockshaft 112 is pivotally coupled to the frame member 102 with the bearing assembly 402.

Figure 5:
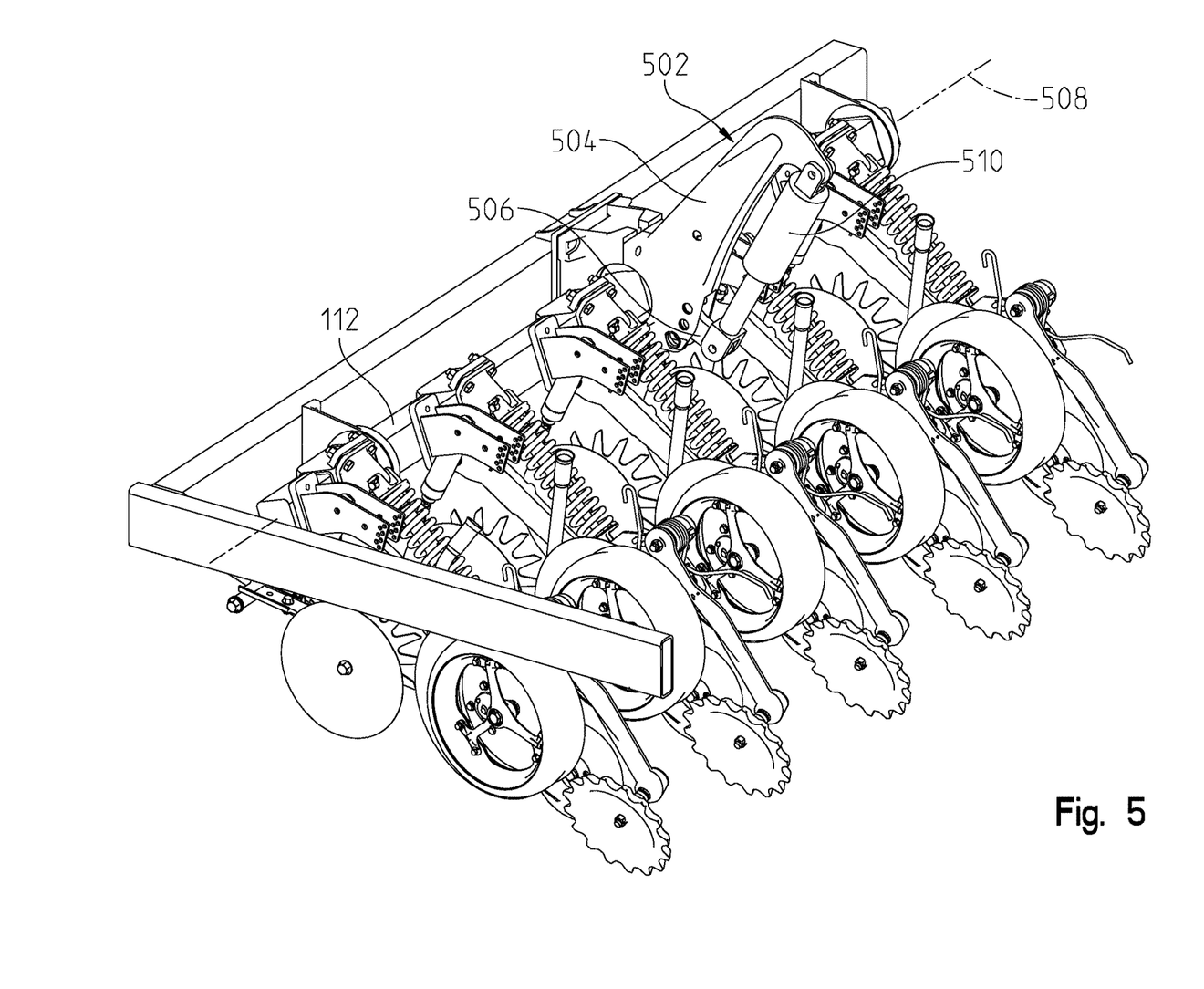
FIG. 5 is an elevated perspective view of one rockshaft section of the seeder of FIG. 1.

Referring now to FIG. 5, a rockshaft positioning assembly 502 is illustrated. The rockshaft positioning assembly 502 may have a mount arm 504 coupled to the frame member 102. The mount arm 504 may be substantially fixedly coupled to the frame member 102 with fasteners, welds, or any other known coupling method. The rockshaft positioning assembly 502 may also have a rockshaft arm 506 that is rotationally coupled to the rockshaft 112. The rockshaft arm 506 may be spaced through a slotted portion of the rockshaft positioning assembly 502 wherein the rockshaft arm 506 can pivot the rockshaft 112 about a rockshaft axis 508. In one aspect of this disclosure, a linear actuator 510 is coupled to the mount arm 504 on one end and to the rockshaft arm 506 on the other. The linear actuator 510 may be selectively shortened and elongated to thereby pivot the rockshaft 112 about the rockshaft axis 508. The linear actuator 510 may be a hydraulic, pneumatic, or electric linear actuator.

Figure 6A:
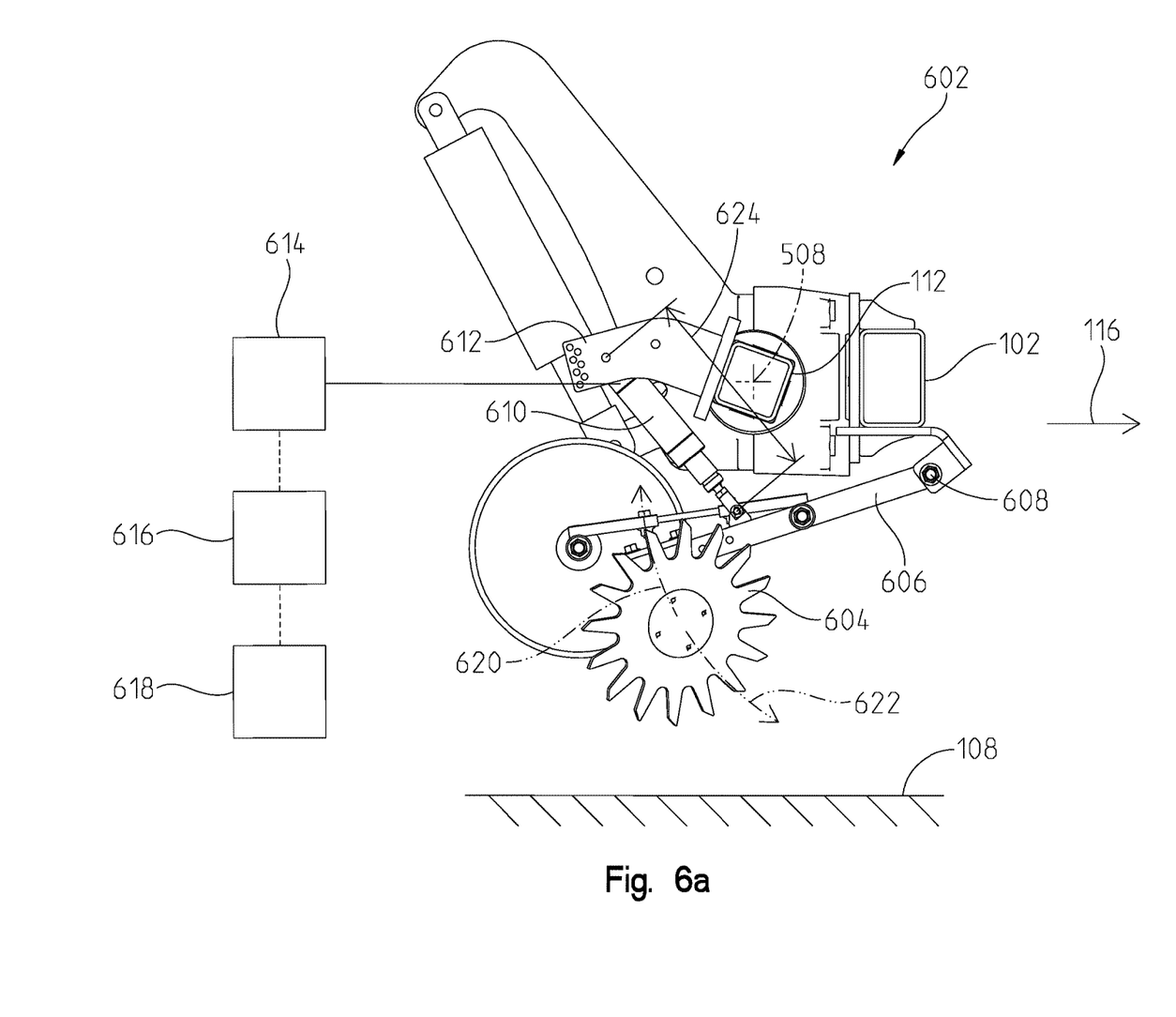
FIG. 6a is a section side view of a row cleaner assembly of the seeder of FIG. 1 in a raised position.
Figure 6B:
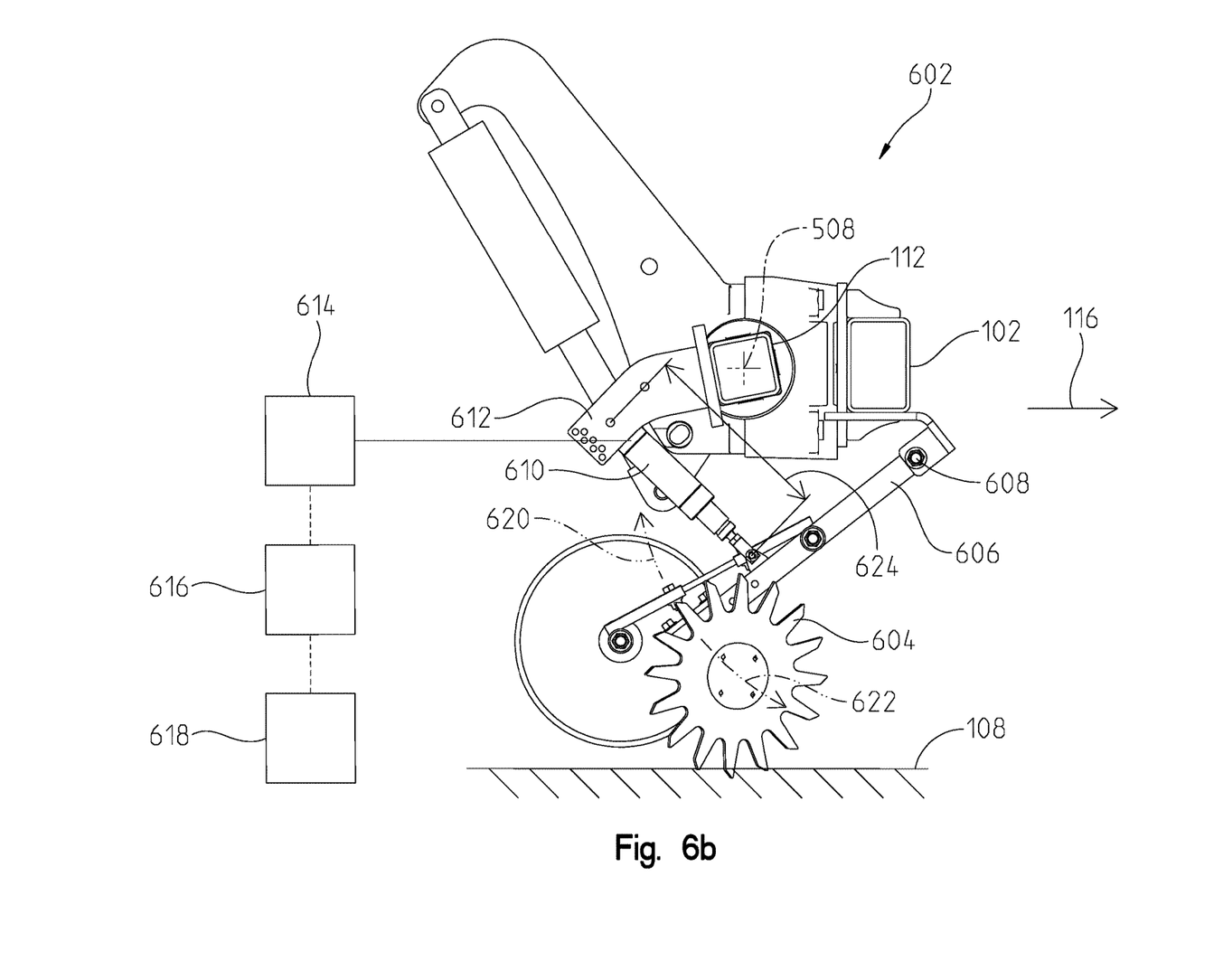
FIG. 6b is a section side view of a row cleaner assembly of the seeder of FIG. 1 in a lowered position.

In one aspect of this disclosure, the linear actuator 510 may be configured to pivot the corresponding rockshaft 112 between a raised position and a lowered position (see for example FIG. 6a for the raised position and FIG. 6b for the lowered position). In the raised position, the linear actuator 510 may pivot the rockshaft 112 about the rockshaft axis 508 sufficiently far to lift the single disk opener 302 of all opener assemblies 114 coupled to the rock shaft out of the underlying surface 108. More specifically with reference back to FIG. 4, each opener assembly 114 may be coupled to the rockshaft 112 through an opener linkage 402 and an opener spring 406. The opener linkage 404 and opener spring 406 may be coupled to the rockshaft 112 on opposite sides thereof to form a triangular linkage to the rockshaft 112. In this configuration, rotation of the rockshaft 112 about the rockshaft axis 508 causes the opener assembly 114 to move along an arc-shaped path 408 between the raised and lowered positions. In other words, altering the length of the linear actuator 510 rotates the rockshaft 112 to thereby correspondingly move any opener assemblies 114 coupled thereto.

The seeder 100 may have any number of rockshafts 112 coupled to opener assemblies 114 as discussed herein depending on the application of the seeder 100. In the non-exclusive example of FIG. 2, there may be six separate rockshafts 112 each having their own linear actuator 510 that can alter the orientation of the opener assemblies 114 coupled thereto. However, other embodiments considered herein have fewer than six rockshafts 112 on a seeder. Further still, other embodiments considered herein have more than six rockshafts 112 along the seeder.

Referring now to FIGS. 6a and 6b, a side view of a row cleaner assembly 602 is illustrated. In one aspect of this disclosure, a row cleaner assembly 602 may be aligned with each opener assembly 114. Accordingly, while one row cleaner assembly 602 is specifically discussed herein with reference to FIGS. 6a and 6b, this disclosure considers implementing a row cleaner assembly 602 for each opener assembly 114. More specifically, each row cleaner assembly 602 may have a row cleaner 604 that is configured to remove at least some residue from the underlying surface 108. As discussed herein, residue on the underlying surface can cause issues during planting when using a single disk opener 302 such as hairpinning or slowed or no emergence due to residue coverage. Accordingly, the row cleaner assembly 602 is positioned along each opener assembly 114 to manipulate any residue on the underlying surface to thereby increase yield and emergence of any seed planted by the opener assembly 114. The row cleaner assembly 602 may reduce hairpinning and clear the surface of the soil to improve exposure of the soil to thereby increase crop yield and emergence among other things.

In one aspect of this disclosure, the row cleaner assembly 602 has an arm 606 with a first or forward end 608 pivotally coupled to the frame member 102. The arm 606 extends downward towards the underlying surface 108 and backwards relative to the direction of travel 116 to provide a location to rotationally couple the row cleaner 604 thereto. Further, a linkage 610 may be coupled to the arm 606 on one end and to a rockshaft bracket 612 on the other. The rockshaft bracket 612 may be coupled to the rockshaft 112 to pivot therewith as the rockshaft 112 pivots between the raised position (FIG. 6a) and the lowered position (FIG. 6b). Accordingly, as the rockshaft 112 pivots about the rockshaft axis 508 the linkage 610 engages the arm 606 to thereby correspondingly pivot the arm 606 about the first end 608.

The linkage 610 may be a mechanical device that is capable of applying a springed force to the arm 606. In one example, the linkage 610 is a pneumatic cylinder that provides a variable springed force to the arm 606 based on a fluid pressure provided to the pneumatic cylinder. In one aspect of the pneumatic cylinder example, an electro-pneumatic system 614 may selectively provide fluid to the pneumatic cylinder 610 at a desired fluid pressure. More specifically, the electro-pneumatic system 614 may have a fluid pump or high-pressure reservoir that is capable of selectively increasing the fluid pressure applied to the pneumatic cylinder through one or more electrically controlled valve assemblies.

The electro-pneumatic system 614 may be selectively manipulated through one or more controller 616. The controller 616 may have a processor and access to a memory unit for storing and executing functions for the electro-pneumatic system 614. In one non-limiting example, the controller 616 may communicate with a user interface 618 to identify a desired spring force input by the user through the user interface 618. Once the controller has identified the spring force input through the user interface, the controller 616 may direct the electro-pneumatic system 614 to manipulate the requisite valves to provide the desired spring force pressure to the linkage 610 which is a pneumatic cylinder.

While a pneumatic system is described herein with reference to the linkage 610, other embodiments may utilize a hydraulic system instead. In this embodiment, the linkage 610 may be a hydraulic cylinder that has a corresponding electro-hydraulic system. An accumulator or the like may be utilized to provide the springed response of the linkage 610 discussed herein and the controller 616 and user interface 618 may interact with the electro-hydraulic system similarly as described herein with reference to the electro-pneumatic system 614.

In other embodiments, the linkage 610 may be a mechanical spring. Further, other embodiments may utilize a chain or similar device for the linkage 610 to allow the row cleaner 604 to pivot about the first end 608 towards the rockshaft bracket 612 but provide a maximum distance from which the row cleaner 604 can pivot about the first end 608 away from the rockshaft bracket 612.

In one aspect of this disclosure, the linkage 610 provides a springed force at least partially away from the rockshaft bracket 612 to ensure that the row cleaner 604 undulates with obstructions on the underlying surface. In one example, if the row cleaner 604 contacts a rock or other similar obstruction, the row cleaner 604 may be forced to pivot about the first end 608 in a first direction 620 away from the obstruction. Once the row cleaner 604 passes over the obstruction, the spring force applied by the linkage 610, or the weight of the row cleaner 604 among other things, may cause the row cleaner 604 to pivot about the first end 608 in a second direction 622 until the row cleaner 604 contacts the underlying surface 108. In this configuration, the row cleaner 604 may travel over any underlying obstructions and quickly return to the underlying surface 108 thereafter.

In another aspect of this disclosure, the linkage 610 of the row cleaner assembly 602 may have a maximum length 624. The maximum length 624 may be the longest length of the linkage 610 under expected operating conditions. As discussed herein, at least one embodiment of this disclosure contemplates utilizing an electro-hydraulic, electro-pneumatic, or mechanical system to provide a variable spring force to the row cleaner assembly 602 through the linkage 610. In any of these embodiments, however, the linkage 610 may have a maximum length 624 wherein the linkage 610 will not elongate to a length greater than the maximum length 624.

The maximum length 624 of the linkage 610 may correspond with the geometry of the rockshaft bracket 612, the amount of pivotal rotation of the rockshaft 112 about the rockshaft axis 508, and the location of the pivoting first end 608 of the arm 606 to ensure the row cleaner 604 is spaced from the underlying surface when the rockshaft 112 is in the raised position. In one aspect of this disclosure, a user may engage the linear actuator 510 to transition the rockshaft 112 from the lowered position to the raised position. As one non-exclusive example, this may occur at the end of a row wherein the user desires to raise the disk opener assemblies 114 above the underlying surface 108 to allow the work machine to turn around and execute a subsequent pass. In this situation, it may be desired to ensure the row cleaner 604 is also spaced from the underlying surface 108 to reduce drag caused by the implement 100 and potentially damaging the field or equipment due to undesired contact during a turnaround event. Accordingly, in one aspect of this disclosure the maximum length 624 of the linkage 610 is such that the row cleaner 604 is spaced from the underlying surface 108 when the rockshaft 112 is in the raised position.

Alternatively, the maximum length 624 is sufficiently long to allow the row cleaner 604 to contact the underlying surface 108 when the rockshaft 112 is in the lowered position. As described herein, the row cleaner 604 is intended to contact and clear at least some of the residue from the underlying surface before the single disk opener 302 contacts the soil. Accordingly, the maximum length 624 of the linkage 610 is sufficiently long to allow the row cleaner 604 to contact the underlying surface 108 when the rockshaft 112 is in the lowered configuration.

The row cleaner 604 can be many different types of row cleaners. In the embodiments illustrated in this disclosure, the row cleaner 604 is a single substantially circular disk with fingers that extend radially away from a central hub. The row cleaner 604 is rotationally coupled to a portion of the arm 606 that is at least partially spaced from the first end 608. However, other embodiments may utilize two row cleaners 604 per row cleaner assembly 602. Alternatively, other embodiments may utilize different finger or disk profiles, brushes or the like for row cleaners. The row cleaner assemblies 602 may also have a depth wheel rotationally coupled to the arm 606 to control the depth of the row cleaner 604.

In another aspect of this disclosure, the row cleaner 604 may be angled relative to the direction of travel 116. More specifically with reference to FIG. 7, the row cleaner 604 may be coupled to a bracket 702 that couples the row cleaner 604 to the arm 606. The bracket 702 may provide a mounting location to define a rotation axis 704 about which the row cleaner 604 rotates. In one aspect of this disclosure, the rotation axis 704 is not perpendicular to a longitudinal axis 706 defined along the direction of travel 116. In this configuration, as the row cleaner 604 contacts the underlying surface 108 it may rotate about the rotation axis 704 as it moves debris away from the path of the single disk opener 302.

Different brackets 702 may be removably coupled to the arm 606 to alter the relationship of the rotation axis 704 relative to the longitudinal axis 706. More specifically, the bracket 702 may be removably coupled to the arm 606 via fasteners or the like. Different bracket 702 may provide different mounting orientations for the rotation axis 704 to thereby provide different angular offsets of the rotation axis 704 relative to the longitudinal axis 706. In yet another embodiment, the bracket 702 may be coupled to the arm 606 with two fasteners. In the embodiment illustrated in FIG. 7, the bracket 702 may have a slotted hole along one of the fasteners to allow the angular position of the bracket 702 to be altered when the fasteners are not clamping the bracket 702 to the arm 606. Once the bracket 702 is positioned as desired by the user, both fasteners may be clamped to the arm 606 to provide a sufficient clamping load on the bracket 702 to substantially prevent the bracket 702 from further movement.

Figure 7:
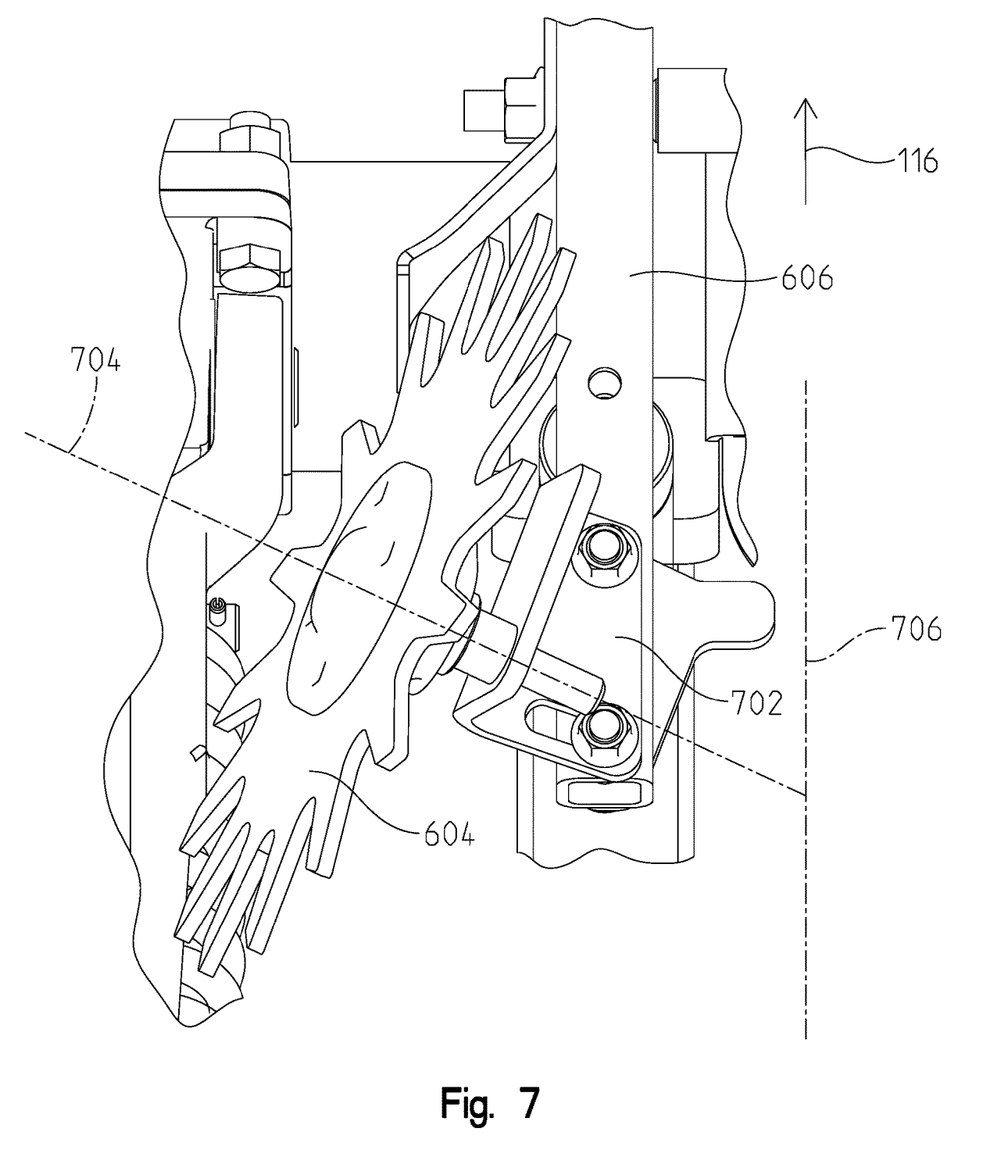
FIG. 7 is a detailed view of a row cleaner of the row cleaner assembly of FIGS. 6a and 6b.

In one aspect of this disclosure, altering the rotation axis 704 offset with the bracket 702 may allow the user to select a rotation axis 704 orientation that is desirable for the field conditions. For example, when the rotation axis 704 is substantially offset from being perpendicular to the longitudinal axis 706, residue contacted by the row cleaner 604 may be thrown or otherwise moved more forcefully away from the row compared to a rotation axis 704 that is only slightly offset from perpendicular to the longitudinal axis 706. Accordingly, the user can alter the residue management characteristics by changing the rotation axis 704 created by the bracket 702.

Figure 8:
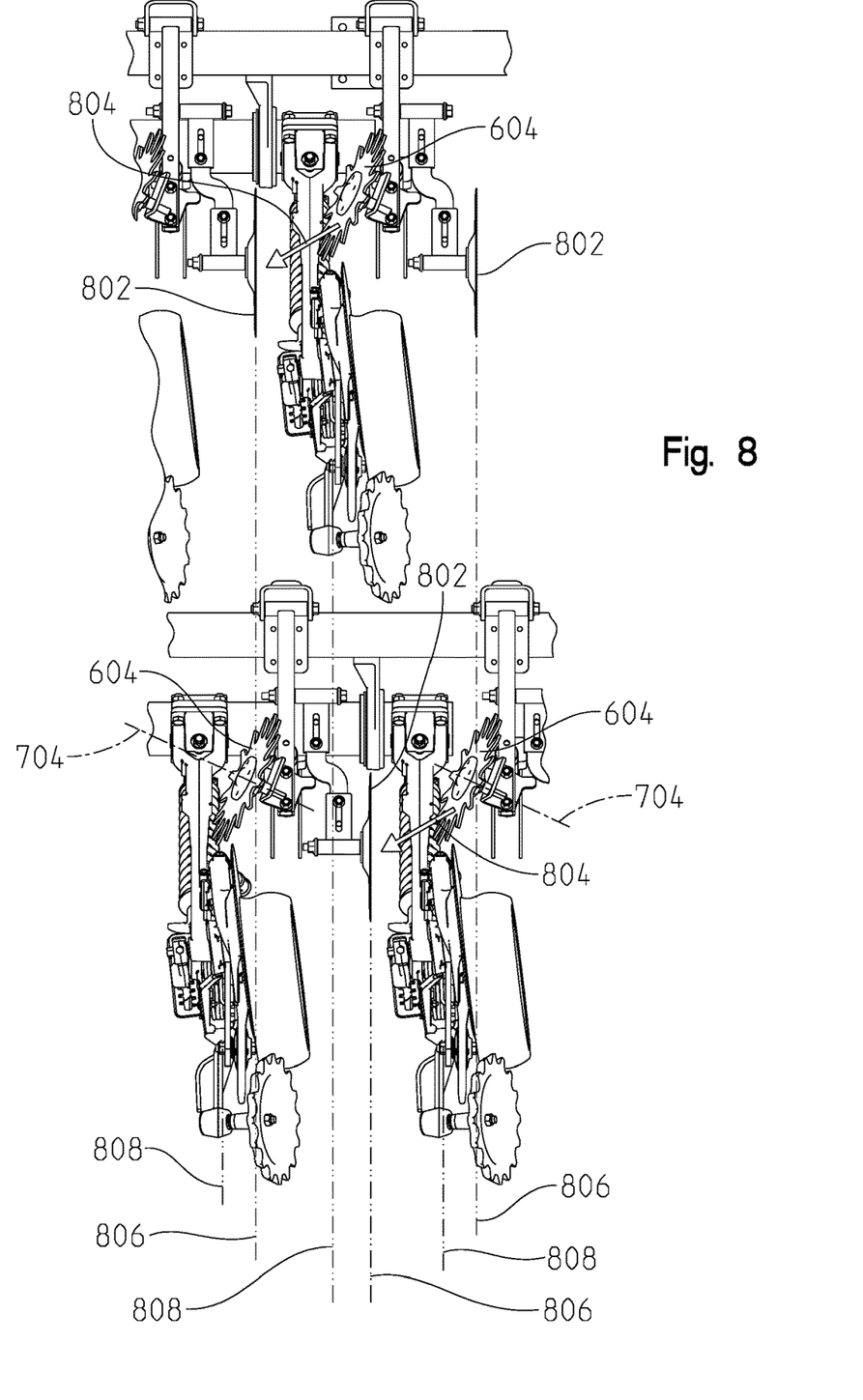
FIG. 8 is a partial bottom view of the seeder of FIG. 1.

In another aspect of this disclosure the final location of residue deflected by the row cleaner 604 may be partially controlled by implementing a residue guard 802 on the row cleaner assembly 602. The residue guard 802 may be a plate or other surface that is positioned on the row cleaner assembly 602 to restrict residue from adjacent row cleaner assemblies 602 from being placed on a row location. As illustrated in FIG. 8, the orientation of the rotation axis 704 may create a residue deflection path 804. The residue deflection path 804 may generally be towards the intended row of one or more disc opener assembly 114. In one aspect of this disclosure, the residue guard 802 is spaced from the adjacent row cleaner assembly 602 to deflect residue on the residue deflection path 804 to form a residue row 806. Further, the residue rows 806 may be spaced from the any rows 808 of the seeder 100. In this configuration, the residue cleared from one row 808 is not compiled onto the adjacent row.

The residue guard 802 may be coupled to the arm 606 to move therewith as described herein with reference to the row cleaner 604. In one aspect of this disclosure, the residue guard 802 may be a substantially circular wheel that rotates about an axis. However, the residue guard may also be substantially fixedly mounted to the arm 606. Regardless, the residue guard 802 may not substantially contact the underlying surface 108 when the rockshaft 112 is in the raised position to further reduce any drag caused by the seeder 100.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A seeder assembly for placing a commodity in underlying soil, comprising:
   a frame member having at least one ground engaging mechanism configured to contact an underlying surface;
   a rockshaft pivotally coupled to the frame member and pivotal between a lowered position and a raised position;
   a plurality of disk opener assemblies coupled to the rockshaft, the disk opener assemblies each having a single disk opener configured to cut into the underlying soil to provide an opening for the commodity;
   a plurality of row cleaner assemblies pivotally coupled to the frame member and each having a row cleaner configured to move residue on the underlying surface; and
   a plurality of linkages each coupling the rockshaft to a corresponding one of the plurality of row cleaner assemblies;
   wherein, when the rockshaft is in the raised position, the plurality of linkages maintain the corresponding plurality of row cleaner assemblies in a raised position wherein each row cleaner of the plurality of row cleaner assemblies is spaced from the underlying surface.

2. The seeder assembly of claim 1, further wherein each of the plurality of linkages is a hydraulic, pneumatic, or spring that provides a downforce to the corresponding row cleaner towards the underlying surface when the rockshaft is in the lowered position.

3. The seeder assembly of claim 1, further wherein each of the plurality of row cleaner assemblies is pivotally coupled to the frame member at a location forward of the corresponding row cleaner in a direction of travel of the seeder assembly.

4. The seeder assembly of claim 1, further wherein the plurality of linkage assemblies each apply a downforce to the corresponding row cleaner towards the underlying surface when the rockshaft is in the lowered position, said downforce being selectably changeable.

5. The seeder assembly of claim 1, further wherein each of the plurality of disk opener assemblies have a gauge wheel and a closing wheel and each of the plurality of disk openers are coupled to the rockshaft wherein when the rockshaft is in the raised position, the disk opener of each of the plurality of disk opener assemblies is spaced from the underlying surface.

6. The seeder assembly of claim 1, further wherein the plurality of disk opener assemblies are spaced to place commodity in rows that are no greater than fifteen inches from an adjacent row of the seeder assembly.

7. The seeder assembly of claim 1, further wherein each of the plurality of disk opener assemblies are fed a commodity through an air hose.

8. The seeder assembly of claim 1, further comprising a residue guard coupled to at least one of the plurality of row cleaner assemblies and spaced therefrom to prevent debris offset by one of the row cleaners from covering an adjacent row.

9. A seeder assembly, comprising:
   a frame;
   a rockshaft pivotally coupled to the frame and pivotal between a lowered position and a raised position;
   a disk opener assembly pivotally coupled to the frame;
   a row cleaner assembly having an arm that is pivotally coupled to the frame on a first end and having a row cleaner rotationally coupled thereto on a second end; and
   a linkage coupled to the rockshaft on one end and the arm on the other end;
   wherein, the first end of the arm is positioned forward of the second end in a direction of travel to allow the row cleaner to pivot at least partially away from obstructions as the seeder assembly moves in the direction of travel
   wherein, as the rockshaft pivots from the lowered position to the raised position, the linkage pivots the arm about the first end relative to the frame.

10. The seeder assembly of claim 9, further wherein the row cleaner is angled relative to the direction of travel to divert residue away from the disk opener assembly.

11. The seeder assembly of claim 10, further wherein the row cleaner assembly has a residue guard coupled to the arm to block residue diverted by an adjacent row cleaner from being positioned over a row created by the disk opener assembly.

12. The seeder assembly of claim 9, further wherein the disk opener assembly is pivotally coupled to the frame through the rockshaft.

13. The seeder assembly of claim 9, further wherein the linkage is a pneumatic cylinder that is part of an electro-pneumatic system wherein the pressure provided to the pneumatic cylinder is selectable through a user interface to alter a down force applied to the arm.

14. The seeder assembly of claim 9, further wherein when the rockshaft is in the raised position, the row cleaner is spaced from an underlying surface.

15. The seeder assembly of claim 9, further wherein the disk opener assembly has no more than one disk opener that is configured to create a slot in underlying soil for a commodity to be placed in.

16. The seeder assembly of claim 15, further wherein the disk opener assembly is coupled to an air seeder assembly that distributes a commodity into the slot created by the one disk opener.

17. A method for assembling a seeder, comprising:
providing a frame member, a rockshaft, a plurality of disk opener assemblies each having a single disk opener, a plurality of row cleaner assemblies each having a row cleaner, and a plurality of linkages;
pivotally coupling the rockshaft to the frame member to allow the rockshaft to pivot between a lowered position and a raised position;
pivotally coupling the plurality of disk opener assemblies to the rockshaft;
pivotally coupling one end of each of the plurality of row cleaner assemblies to the frame member; and
coupling each of the plurality of linkages to the rockshaft on one end and to one of the plurality of row cleaner assemblies on the other end;
wherein, when the rockshaft is in the raised position, the plurality of linkages maintain the corresponding plurality of row cleaner assemblies in a raised position wherein each row cleaner of the plurality of row cleaner assemblies is spaced from the underlying surface.

18. The method of assembling the seeder of claim 17, further wherein each of the plurality of linkages are pneumatic cylinders and the pneumatic cylinders are fluidly coupled to an electro-pneumatic system.

19. The method of assembling the seeder of claim 17, further comprising coupling a residue guard to at least one of the plurality of row cleaner assemblies.

\* \* \* \* \*